United States Patent [19]

Palmero et al.

[11] Patent Number: 4,714,853
[45] Date of Patent: Dec. 22, 1987

[54] LOW PROFILE ELECTRIC MOTOR

[75] Inventors: Albert Palmero, Harwinton; Charles Hansen, Wolcott, both of Conn.

[73] Assignee: Tri-tech, Inc., Waterbury, Conn.

[21] Appl. No.: 903,470

[22] Filed: Sep. 4, 1986

[51] Int. Cl.⁴ .......................................... H02K 21/14
[52] U.S. Cl. .................................... 310/257; 310/266
[58] Field of Search ................. 310/49 R, 67 R, 162, 310/257, 156, 266

[56] References Cited

U.S. PATENT DOCUMENTS

| 3,304,451 | 2/1967 | Scholten . | |
| 3,437,897 | 4/1969 | Lenny | 310/257 |
| 3,508,091 | 4/1970 | Kavanaugh . | |
| 3,532,916 | 10/1970 | Fisher | 310/266 |
| 3,633,055 | 1/1972 | McBride . | |
| 3,693,034 | 9/1972 | Inariba . | |
| 3,808,491 | 4/1974 | Riggs . | |
| 4,070,592 | 1/1978 | Snowden et al. | 310/266 |
| 4,104,552 | 8/1978 | Tsergas | 310/156 |
| 4,137,473 | 1/1979 | Pfister | 310/156 |
| 4,174,485 | 11/1979 | Soden et al. | 310/49 R |
| 4,501,980 | 2/1980 | Welburn | 310/266 |
| 4,517,484 | 5/1985 | Dacier | 310/266 |
| 4,564,778 | 1/1986 | Yoshida | 310/156 |

FOREIGN PATENT DOCUMENTS 2404784 8/1975 Fed. Rep. of Germany ...... 310/266

Primary Examiner—Peter S. Wong
Assistant Examiner—D. L. Rebsch
Attorney, Agent, or Firm—Lee C. Robinson, Jr.

[57] ABSTRACT

An electric motor has an annular permanent magnetic rotor having rotor poles of alternating polarity around its circumference. The motor has an outer stator disposed concentrically around the outer periphery of the rotor which has an annular configuration and a plurality of axially extending salient magnetic poles of opposite polarity alternating around the outer stator's inner periphery. The motor also has an inner stator disposed concentrically within the inner periphery of the rotor which has an annular configuration and a plurality of axially extending salient magnetic poles of opposite polarity alternating around the inner stator's periphery. A separately energizable annular coil of wire disposed inside each stator energizes that stator's magnetic poles in response to sequential energization of each coil with electricity in different phase relationship with each other.

7 Claims, 8 Drawing Figures

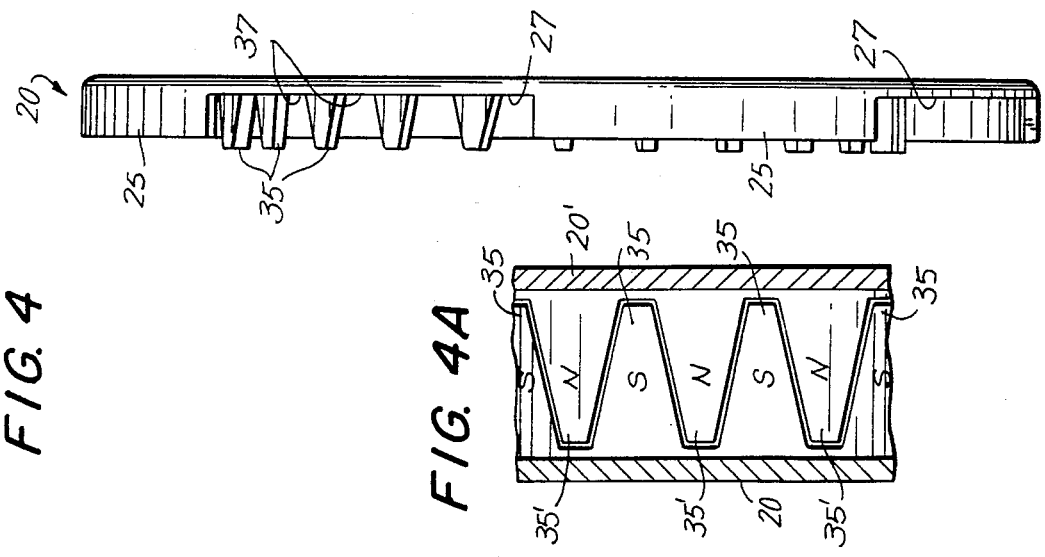
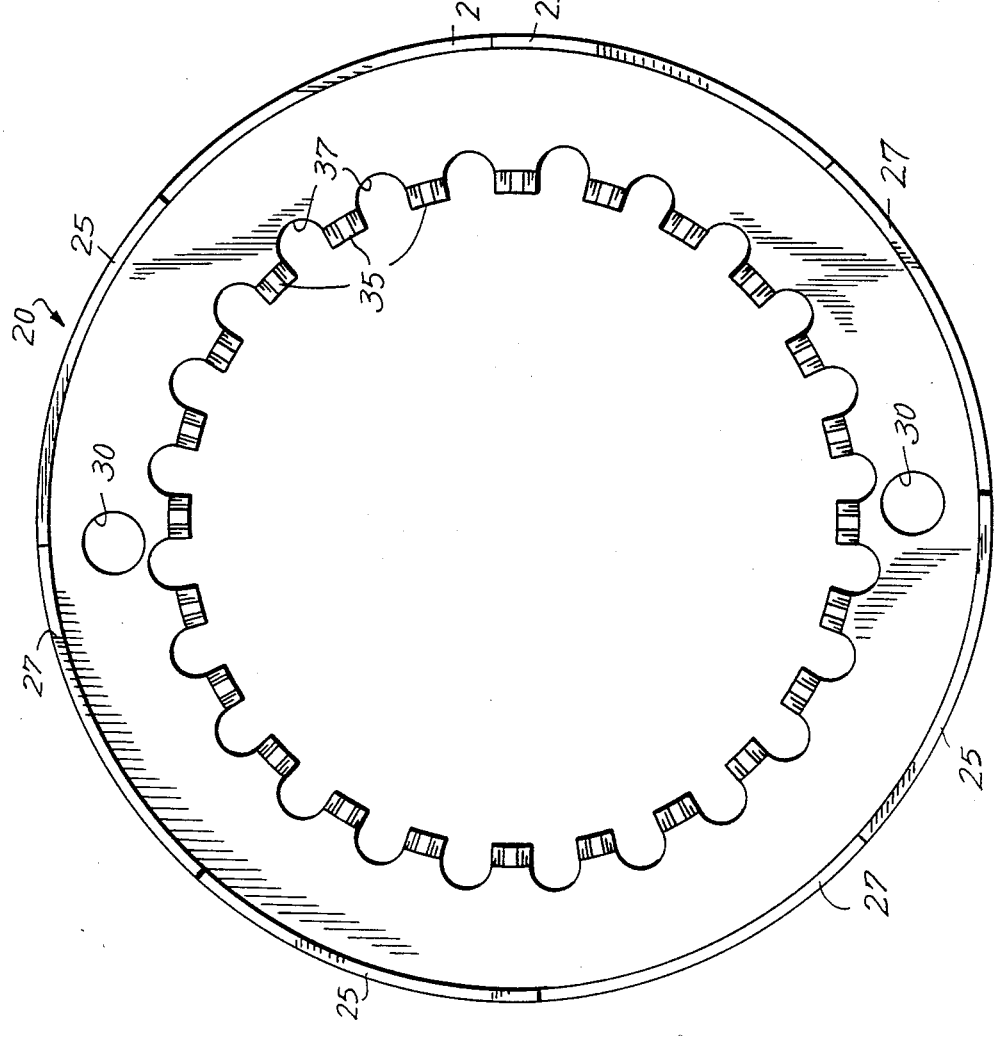
FIG. 4
FIG. 4A
FIG. 3

LOW PROFILE ELECTRIC MOTOR

BACKGROUND OF THE INVENTION

This invention relates to electric rotating machines and more particularly to electric motors of the type in which the rotor of the motor turns in discrete increments or steps.

There has been developed a class of alternating current synchronous and stepper motors which exhibit extremely rapid starting characteristics and are highly efficient. Included in this class are motors utilizing a permanent magnet rotor having a plurality of alternating poles and annular stators mounted side by side in tandem with a plurality or salient stator poles on their inner peripheries. The windings of each of the stators are independently energizable out of phase with one another so that the rotational direction of the motor can be controlled.

While motors of this class are satisfactory for many purposes, such motors have exhibited certain disadvantages. For example, because of the tandem arrangement of the energizing windings, such motors are not readily adaptable for applications which require a motor having a very low profile, or a pancake-type construction, such as may be required of motors for computer disk drives or automobile electric windows. In addition, because there are structural limitations as to how thin the magnetic rotor can be, the thickness, and hence the weight, inertia and cost, of the permanent magnet rotor of prior art tandem stator motors may be as much as twice as great as magnetically required to develop full torque. Furthermore, such motors have a considerable amount of wasted space, making such motors undesirable where compact construction is needed.

It is therefore an object of the present invention to provide a motor having a low profile, pancake-type construction wherein the magnetic rotor is efficiently utilized magnetically to provide increased torque with no increased weight of the rotor and which is very compact in construction with a minimum of unused space.

SUMMARY OF THE INVENTION

The foregoing and other objects are accomplished by means of an electric rotating machine in accordance with the present invention. In a preferred embodiment, the machine includes an annular permanent magnetic rotor having rotor poles of alternating polarity around its circumference. An outer stator is included which comprises a first pair of pole pieces of annular configuration in opposed relationship with each other to form an annular space therebetween, each of the first pair of pole pieces being disposed around the outer periphery of the rotor. Each pole piece in the first pair includes on its inner periphery spaced-apart axially extending salient stator poles in magnetic flux relationship with the rotor poles, the stator poles of the respective pole pieces being interleaved with one another. An inner stator is included which comprises a second pair of pole pieces of annular configuration in opposed relationship with each other to form an annular space therebetween, each of the second pair of pole pieces being disposed within the inner periphery of the rotor. Each pole piece in the second pair includes on its outer periphery spaced-apart axially extending salient stator poles in magnetic flux relationship with the rotor poles, with the stator poles of the respective pole pieces being interleaved with one another. First annular energizing means are provided surrounding the outer periphery of the rotor and disposed substantially entirely within the annular space between the first pair of stator pole pieces for producing a magnetic field in the salient stator poles of the first pair. A second annular energizing means is provided within the inner periphery of the rotor and disposed substantially entirely within the annular space between the second pair of stator pole pieces for producing a magnetic field in the salient stator poles of the second pair. Means for sequentially energizing said first and second energizing means to respectively produce the corresponding magnetic field with said fields in different phase relationship with each other is provided.

The above and other objects, features and advantages of the present invention will be apparent from the following detailed description of illustrative embodiments thereof, which is to be read in conjunction with the accompanying drawings, wherein:

BRIEF DESCRIPTION OF THE DRAWINGS

FIG. 3 is a plan view of one of the pair of cup-shaped annular pole pieces of the outer stator.

FIG. 4 is an elevational view of the cup-shaped stator pole piece of FIG. 3.

FIG. 4A is a sectional view taken along the line 4A—4A of FIG. 2 showing the interleaving of the stator poles of the pole pieces of FIG. 3 and FIG. 4, when assembled together as a pair to form the outer stator.

DETAILED DESCRIPTION

Figure 1:
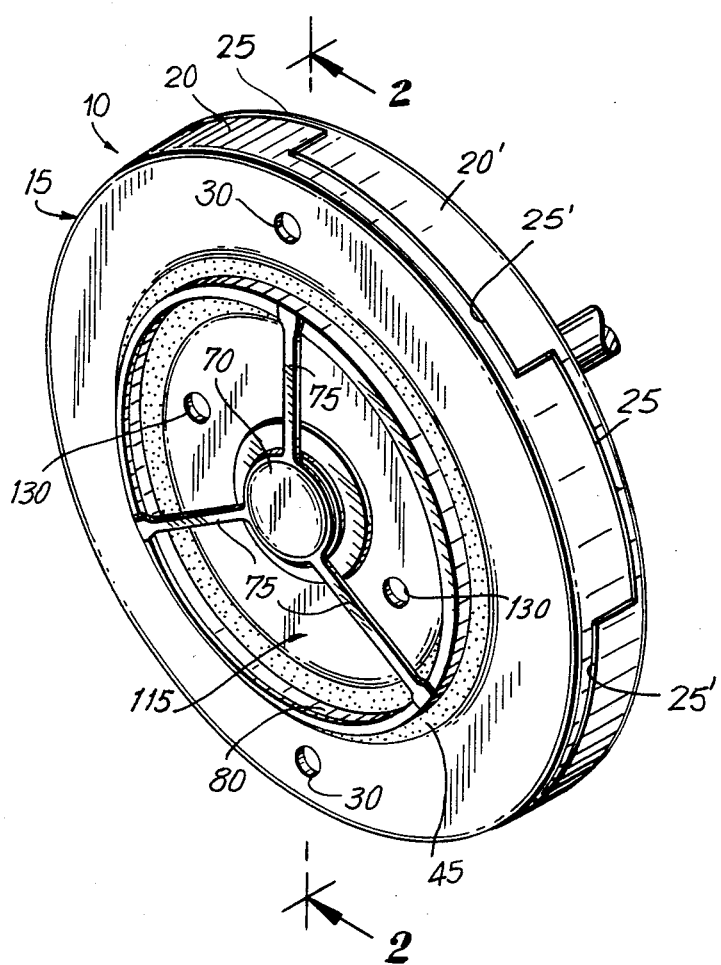
FIG. 1 is a front perspective view of a stepper motor in accordance with an illustrative embodiment of the present invention.
Figure 2:
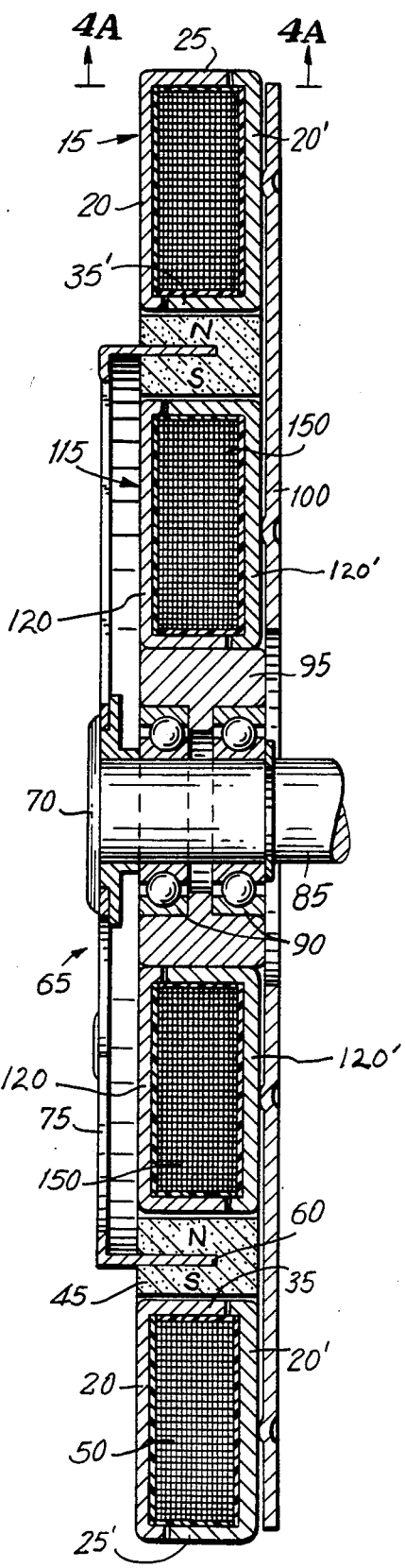
FIG. 2 is a cut-away view of the motor taken along line 2—2 of FIG. 1.
Figure 6:
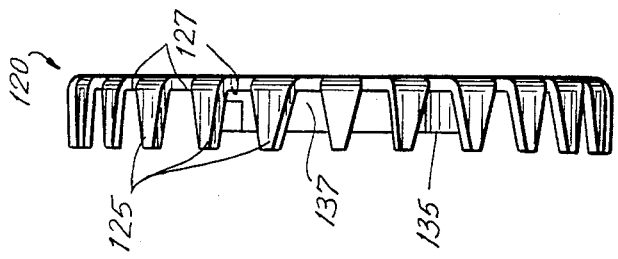
FIG. 6 is an elevational view of the cup-shaped stator pole piece FIG. 5.
Figure 5:
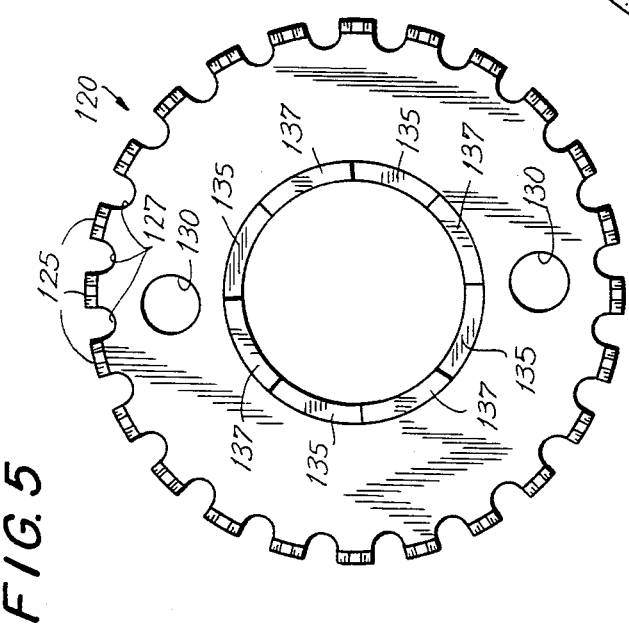
FIG. 5 is a plan view of one of the pair of annular cup-shaped pole pieces of the inner stator.
Figure 7:
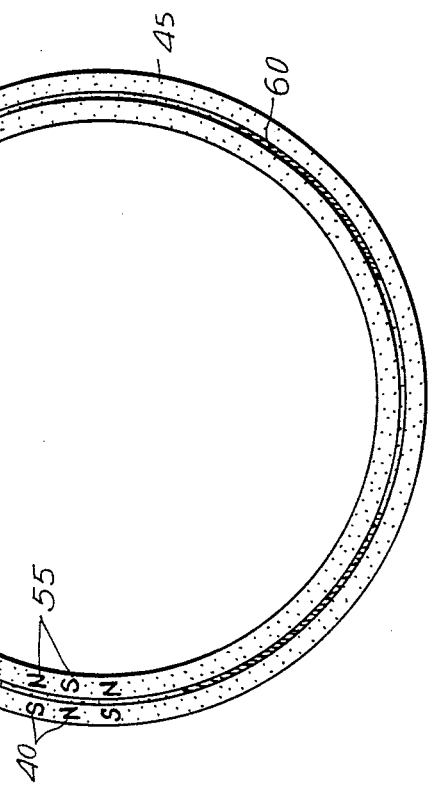
FIG. 7 is a plan view of the non-salient permanent magnet rotor.

Referring now to the drawings in detail, and initially to FIGS. 1, 2 and 7, an electric motor 10 constructed in accordance with a preferred embodiment of the present invention is illustrated.

In this preferred embodiment, the motor 10 has an annular permanent magnet rotor 45 having a first set of non-salient rotor poles 40 of alternating polarity around its outer periphery and a corresponding second set of non-salient rotor poles 55 of opposite polarity around its inner periphery, each rotor pole 40 of the first set being in radial alignment with a rotor pole 55 of opposite polarity in the second set. Non-salient rotor poles are preferred because of decreased cost of such rotors over salient rotor poles or individual permanent magnets supported in an annular non-magnetic carrier. However, an annular rotor having salient rotor poles or individual permanent magnets supported in an annular non-magnetic carrier can also be used.

In the preferred embodiment shown in FIG. 7, the permanent magnet rotor has twenty-four non-salient north poles, and twenty-four non-salient south poles alternating around its outer periphery, for a total of 48 poles, and a like number around its inner periphery. The radially aligned poles on the inner and outer periphery of the rotor are preferably of opposite polarity. Although preferred, it is not necessary that the radially aligned poles on the inner and outer peripheries of the rotor be of opposite polarity, since a rotor constructed with radially aligned poles of like polarity with also work in the invention. If radially aligned rotor poles of like polarity poles are used, however, the inner and outer stators must, of course, be angularly displaced so that their poles will be in appropriate alignment with the poles of the rotor. In any event, the total number of rotor poles can, of course, be any even number.

The rotor is supported by a wheel 65 comprising a hub 70, spokes or ribs 75, and an outer rotor ring 80. Instead of the spokes and hub arrangement shown, a solid wheel can, of course, be used interchangeably, and this is actually preferred due to the low cost and ease of fabrication. The rotor is constructed with an annular slot 60 on its front face which is adapted to receive the rotor ring 80. The rotor ring is preferably made of a lightweight, non-magnetic material such as aluminum to minimize weight and magnetic flux leakage and may be attached to the rotor by interference fit, adhesives or other convenient means. The purpose of the rotor ring 80 and mating slot 60 is to provide an inexpensive and secure connection of the wheel 65 to the rotor 45. Thus, the rotor ring 80 can, of course, be omitted if the wheel is otherwise secured to the rotor 45 directly, such as by screws or adhesive.

The hub 70 of wheel 65 is connected to driving shaft 85, which is constructed of strong material such as stainless steel. Shaft 85 is supported by ball bearings 90 retained in a bearing block 95 to permit rotation. The bearing block is, in turn, attached to base plate 100 by any suitable means, such as by welding or bolting.

The motor 10 has an outer stator 15 of annular configuration disposed generally concentrically around the outer periphery of the rotor 45. The outer stator 15 comprises a pair of cup-shaped pole pieces 20 and 20'. Pole pieces 20 and 20' are mated together in an opposed relationship to form an annular space between them to receive energizing means comprising an annular wound coil of wire 50. This coil of wire 50 is disposed substantially entirely within the annular space, as shown in cross-section in FIG. 2. Preferably, pole pieces 20 and 20' are identical, thus achieving economies in manufacturing and spare parts inventories. Pole pieces 20 and 20' are identical in this preferred embodiment.

Referring now to FIGS. 3 and FIG. 4, the construction of the outer stator pole piece 20 will be further described. Because, in the preferred embodiment shown, pole pieces 20 and 20' are identical, only pole piece 20 is shown in these figures.

On its inner periphery, pole piece 20 has a plurality of spaced apart salient poles 35, preferably tapered, which in the case of a rotor having twenty-four north and twenty-four south poles on its outer periphery, is preferably twenty-four. Between adjacent stator poles are valleys 37 of similar geometry to the poles, but slightly wider and deeper than the poles so that when the paired pole pieces are mated together with the poles on one pole piece interleaved with those on the mating pole piece, the interleaved poles will not touch each other. Thus, the magnetic flux of the salient outer stator poles 35 (and 35' for pole piece 20') will interact with the poles 40 of rotor 45. The interleaving of the poles of stator pole piece 20 and 20' is shown in FIG. 4A.

To maintain the interleaved poles 35 and 35' in proper alignment with one another, pole piece 20 has alternating mating teeth 25 and slots 27 around its outer periphery. These mating teeth and slots are preferably generally square cut and of the same height and width for ease of manufacturing and assembly, and so that identical pole pieces will mate together tooth-in-slot with the poles 35 and 35' properly interleaved. The teeth 25 and slots 27 preferably mesh as tightly together as possible so as to make a complete magnetic circuit around the outer periphery of the stator with a minimum of flux leakage across the tooth joints. The pole pieces 20 should be formed of a magnetically soft material such as ASTM 1008 cold rolled steel.

To ensure proper positioning of the pole piece 20 on the base plate 100, two index holes 30 on opposite sides of the centerline of the pole piece 20 are provided. The index holes 30 are located 90 electrical degrees from the center line of one of the poles. Thus, when identical pole pieces 20 and 20' are mated together with the holes 30 aligned with each other, the outer mating teeth 25 and 25' and corresponding slots 27 and 27' will mate properly and the poles 35 and 35' and valleys 37 and 37' on the inner periphery will interleave properly. To minimize the profile height of the motor, the axial thickness of the stator 15, with pole pieces 20 and 20' mated together is preferably less than the axial thickness of the rotor 45.

Referring now to FIGS. 1, 2, 5 and 6, the construction of the inner stator 115 will be described. Inner stator 115 is generally similar to outer stator 15 in construction and function, except that poles 125 and valleys 127 are on its outer periphery, the mating teeth 135 and slots 137 are on its inner periphery. Furthermore, the inner stator 115 is also disposed generally concentrically with the rotor 45, but on the inner periphery of rotor 45, between the bearing block 95 and the rotor 45. As with the outer stator 15, the inner stator 115 comprises a pair of pole pieces 120 and 120', preferably identical, which have interleaved salient poles 125 and preferably square cut mating teeth 135. The number of poles on each inner pole piece (120 and 120') is preferably the same as the number of poles on each outer pole piece. Each pole piece 120 and 120' has index holes 130 on opposite sides of the centerline of the pole piece. The poles of mating pole pieces interleave in the same way as the poles of the outer stator pole pieces (i.e. as shown in FIG. 4A), and the preferred material of construction is the same. To minimize the profile height of the motor, the axial thickness of the inner stator 115 is also preferably less than the axial thickness of the rotor 45.

The inner stator 115 is mounted to the base place by any convenient means, such as welding or bolting, with its poles preferably 90 electrical degrees offset from the corresponding poles of the outer stator 15. As can be seen in FIG. 2, the inner stator 115 takes up virtually all the space between the inner periphery of the rotor 45 and the bearing block 95, thus achieving a very compact construction with an absolute minimum of wasted space. Because the rotor 45 is flanked on both its inner and outer peripheries by stators, rather than only on its outer periphery as with a tandem stator configuration, the motor has been found to have increased torque output for the same weight rotor, as compared with motors of the tandem configuration.

As shown in cross section in FIG. 2, energizing means comprising an annularly wound coil 150, is disposed substantially entirely within the annular space formed between the inner pair of stator pole pieces 120 and 120' comprising the inner stator 115.

In operation, each of the coils are sequentially energized, preferably by separate sources of electrical current 90 electrical degrees out of phase with one another, so that the stepping angle will be uniform and so that the direction of rotation of the rotor can be controlled. At rest, with neither inner nor outer stators energized, the rotor will reach a stable intermediate position. When, for example, the outer coil is energized with current in the clockwise direction (facing the front end of the motor), the salient stator poles of the outer stator will become magnetized alternatingly north and south, and the rotor will advance one step of 3.75 degrees (360 degrees divided by 2N, where 2 is the number of electrical phases and N is the number of poles on the rotor, which is 48 for the motor 10 shown in the figures), aligning itself magnetically with the salient stator poles 35 and 35' of the outer stator 15. When the rotor has advanced 90 electrical degrees, clockwise energization of the inner stator coil commences, which will advance the rotor one more 3.75 degree step. The direction of current in the outer stator coil may then be reversed, which will advance the rotor to the next step, and so on.

If a smaller stepping angle in desired for a rotor having a particular number of poles, more phases of energizing current (and consequently more stators) can be used. Thus, if three phase electricity is used, the electricity should be 60 electrical degrees out of phase, and the stepping angle would be 360 degrees divided by 3N, where N is the number of poles on the rotor. Such a motor can be constructed by adding a third stator in tandem with either the inner or outer stator, with the axial thickness of the rotor increased to accomodate the tandem stator, or the tandem stators made axially thinner and radially thicker. A three phase motor can also be constructed by adding another outer rotor concentrically with the inner rotor, around the outside of the outer stator, and a third stator added concentrically around this outer rotor. Four, or any number of phases of electricity can be accommodated in the same manner.

The terms and expressions which have been employed herein are used as terms of description and not of limitation, and there is no intention in the use of such terms or expressions of excluding any equivalents of the features shown and described or portions thereof. Although illustrative embodiments of the invention have been described herein with reference to the accompanying drawings, it is to be understood that various changes and modifications can be effective therein without departing from the scope or spirit of the invention.

What is claimed is:

1. A synchronous electric motor comprising, in combination:

an annular permanent magnet rotor having rotor poles of alternating polarity around its circumference;

an outer stator comprising a first pair of pole pieces of annular configuration in opposed relationship with each other to form an annular space therebetween, each of said first pair of pole pieces being disposed around the outer periphery of said rotor, each said pole piece in said first pair including on its inner periphery spaced-apart, axially extending salient stator pole in magnetic flux relationship with the rotor poles, with the stator poles of the respective pole pieces being interleaved with one another;

an inner stator comprising a second pair of pole pieces of annular configuration in opposed relationship with each other to form an annular space therebetween, each of said seoond pair of pole pieces being disposed within the inner periphery of said rotor, each said pole piece in said second pair including on its outer periphery spaced-apart, axially extending salient stator poles in magnetic flux relationship with the rotor poles, with the stator poles of the respective pole pieces being interleaved with one another;

first annular energizing means surrounding the outer periphery of the rotor and comprising electrically conductive wire annularly wound substantially entirely within the annular space between the first pair of stator pole pieces for producing a magnetic field in the salient stator poles of said first pair; and second annular energizing means within the inner periphery of the rotor and comprising electrically conductive wire annularly wound substantially entirely within the annular space between the second pair of stator pole pieces for producing a magnetic field in the salient stator poles of said second pair; and means for sequentially energizing said first and second energizing means to respectively produce the corresponding magnetic field with said fields in different phase relationship with each other.

2. A synchronous electric motor comprising, in combination:

an annular permanent magnet rotor having rotor poles of alternating polarity around its circumference;

an outer stator comprising a first pair of pole pieces of annular configuration in opposed relationship with each other to form an annular space therebetween, each of said first pair of pole pieces being disposed concentrically around the outer periphery of said rotor, each said pole piece in said first pair including on its inner periphery spaced-apart, axially extending salient stator poles in magnetic flux relationship with the rotor poles, with the stator poles of the respective pole pieces being interleaved with one another;

an inner stator comprising a second pair of pole pieces of annular configuration in opposed relationship with each other to form an annular space therebetween, each of said second pair of pole pieces being disposed concentrically within the inner periphery of said rotor, each said pole piece in said second pair including on its outer periphery spaced-apart, axially extending salient stator pole in magnetic flux relationship with the rotor poles, with the stator poles of the respective pole pieces being interleaved with one another;

first annular energizing means surrounding the outer periphery of the rotor and comprising electrically conductive wire annularly wound substantially entirely within the annular space between the first pair of stator pole pieces for producing a magnetic field in the salient stator poles of said first pair; and second annular energizing mean within the inner periphery of the rotor and comprising electrically conductive wire annularly wound substantially entirely within the annular space between the second pair of stator pole pieces for producing a magnetic field in the salient stator poles of said second pair; and means for sequentially energizing said first and second energizing means to respectively produce the corresponding magnetic field with said fields in different phase relationship with each other.

3. A synchronous electric motor comprising, in combination:

an output shaft;

an annular permanent magnet rotor having a first set of nonsalient rotor poles of alternating polarity around its outer periphery and a second set of nonsalient rotor poles of opposite polarity around its inner periphery, each of the rotor poles in said first set being in radial alignment with a rotor pole of opposite polarity in said second set, said rotor being mechanically connected to the output shaft;

an outer stator comprising a first pair of pole pieces of annular configuration in opposed reltaionship with each other to form an annular space therebetween, each of said first pair of pole pieces being disposed concentrically around the outer periphery of said rotor, each said pole piece in said first pair including on its inner periphery spaced-apart, axially extending salient stator poles in magnetic flux relationship with the first set of rotor poles, with the stator poles of the respective pole pieces being interleaved with one another;

an inner stator comprising a second pair of pole pieces of annular configuration in opposed relationship with each other to form an annular space therebetween, each of said second pair of pole pieces being disposed concentrically within the inner periphery of said rotor, each said pole piece in said second pair including on its outer periphery spaced-apart, axially extending salient stator pole in magnetic flux relationship with the second set of rotor poles, with the stator poles of the respective pole pieces being interleaved with one another;

first annular energizing means surrounding the outer periphery of the rotor and comprising electrically conductive wire annularly wound substantially entirely within the annular space between the first pair of stator pole pieces for producing a magnetic field in the salient stator poles of said first pair; and second annular energizing means within the inner periphery of the rotor and comprising electrically conductive wire annularly wound substantially entirely within the annular space between the second pair of stator pole pieces for producing a magnetic field in the salient stator poles of said second pair; and means for sequentially energizing said first and second energizing means to respectively produce the corresponding magnetic field with said fields in different phase relationship with each other.

4. A synchronous electric motor comprising, in combination:

an output shaft;

an annular permanent magnet rotor having a first set of rotor poles of alternating polarity around its outer periphery and a second set of rotor poles of opposite polarity around its inner periphery, each of the rotor poles in said first set being in radial alignment with a rotor pole of opposite polarity in said second set, said rotor being mechanically connected to the output shaft;

an outer stator comprising a first pair of pole pieces of annular cup-shaped configuration in opposed relationship with each other to form an annular space therebetween, each of said first pair of pole pieces being disposed concentrically around the outer periphery of said rotor, each said pole piece in said first pair including on its inner periphery spaced-apart, axially extending salient stator poles in magnetic flux relationship with the first set of rotor poles, with the stator poles of the respective pole pieces being interleaved with one another, all of said poles being substantially identical to one another and being tapered in the axial direction;

an inner stator comprising a second pair of pole pieces of annular cup-shaped configuration in opposed relationship with each other to form an annular space therebetween, each of said second pair of pole pieces being disposed concentrically within the inner periphery of said rotor, each said pole piece in said second pair including on its outer periphery spaced-apart, axially extending salient stator poles in magnetic flux relationship with the second set of rotor poles, with the stator poles of the respective pole pieces being interleaved with one another, all of said poles being substantially identical to one another and being tapered in the axial direction;

first annular energization means surrounding the outer periphery of the rotor and comprising electrically conductive wire annular wound substantially entirely within the annular space between the first pair of stator pole pieces for producing a magnetic field in the salient stator poles of said first pair; and second annular energizing means within the inner periphery of the rotor and comprising electrically conductive wire annularly wound substantially entirely within the annular space between the second pair of stator pole pieces for producing a magnetic field in the salient stator poles of said second pair; and means for sequentially energizing said first and second energizing means to respectively produce the corresponding magnetic field with said fields in different phase relationship with each other.

5. A synchronous electric motor comprising, in combination:

an output shaft;

an annular permanent magnet rotor having a first set of rotor poles of alternating polarity around its outer periphery and a second set of rotor poles of opposite polarity around its inner periphery, each of the rotor poles in said first set being in radial alignment with a rotor pole of opposite polarity in said second set, said rotor being mechanically connected to the output shaft;

an outer stator comprising a first pair of pole pieces of annular cup-shaped configuration in opposed relationship with each other to form an annular space therebetween, each of said first pair of pole pieces being substantially identical to each other and disposed concentrically around the outer periphery of said rotor and having an axial dimension which is not greater than that of the rotor, each said pole piece in said first pair including on its inner periphery spaced-apart, axially extending salient stator poles in magnetic flux relationship with the first set of rotor poles, with the stator poles of the respective pole pieces being interleaved with one another;

an inner stator comprising a second pair of pole pieces of annular cup-shaped configuration in opposed relationship with each other to form an annular space therebetween, each of said second pair of pole pieces being substantially identical to each other and disposed concentrically within the inner periphery of said rotor and having an axial dimension which is not greater than that of the rotor, each of said pole piece in said second pair including on its outer periphery spaced-apart, axially extending salient stator poles in magnetic flux relationship with the second set of rotor poles, with the stator poles of the respective pole pieces being interleaved with one another;

first annular energizing means surrounding the outer periphery of the rotor and comprising electrically conductive wire annularly wound substantially entirely within the annular space between the first pair of stator pole pieces for producing a magnetic field in the salient stator poles of said first pair; and second annular energizing means within the inner periphery of the rotor and comprising electrically conductive wire annularly wound substantially entirely within the annular space between the second pair of stator pole pieces for producing a magnetic field in the salient stator poles of said second pair; and means for sequentially energizing said first and second energizing means to respectively produce the corresponding magnetic field with said fields in different phase relationship with each other.

6. A synchronous electric motor comprising, in combination:

an output shaft;

an annular permanent magnet rotor having a first set of nonsalient rotor poles of alternating polarity around its outer periphery and a second set of nonsalient rotor poles of opposite polarity around its inner periphery, each of the rotor poles in said first set being in radial alignment with a rotor pole of opposite polarity in said second set, said rotor being mechanically connected to the output shaft;

an outer stator comprising a first pair of pole pieces of annular cup-shaped configuration in opposed relationship with each other to form an annular space therebetween, each of said first pair of pole pieces being substantially identical to each other and disposed concentrically around the outer periphery of said rotor, each said pole piece in said first pair including on its inner periphery spaced-apart, axially extending salient stator poles in magnetic flux relationship with the first set of nonsalient rotor poles, with the stator poles of the respective pole pieces being interleaved with one another;

an inner stator comprising a second pair of pole pieces of annular cup-shaped configuration in opposed relationship with each other to form an annular space therebetween, each of said second pair of pole pieces being substantially identical to each other and disposed concentrically within the inner periphery of said rotor. each said pole piece in said second pair including on its outer periphery spaced-apart, axially extending salient stator poles in magnetic flux relationship with the second set of nonsalient rotor poles, with the stator poles of the respective pole pieces being interleaved with one another;

first annular energizing means surrounding the outer periphery of the rotor and comprising electrically conductive wire annularly wound substantially entirely within the annular space between the first pair of stator pole pieces for producing a magnetic field in the salient stator poles of said first pair; and second annular energizing means within the inner periphery of the rotor and comprising electrically conductive wire annularly wound substantially entirely within the annular space between the second pair of stator pole pieces for producing a magnetic field in the salient stator poles of said second pair; and means for sequentially energizing said first and second energizing means to respectively produce the corresponding magnetic field with said fields in different phase relationship with each other.

7. A synchronous electric motor comprising, in combination:

an output shaft;

an annular permanent magnet rotor having a first set of nonsalient rotor poles of alternating polarity around its outer periphery and a second set of nonsalient rotor poles of opposite polarity around its inner periphery, each of the rotor poles in said first set being in radial alignment with a rotor pole of opposite polarity in said second set, said rotor being mechanically connected to the output shaft;

an outer stator comprising a first pair of pole pieces of annular cup-shaped configuration in opposed relationship with each other to form an annular space therebetween, each of said first pair of pole pieces being substantially identical to each other and disposed concentrically around the outer periphery of said rotor and having an axial dimension which is not greater than that of the rotor, each said pole piece in said first pair including on its inner periphery spaced-apart, axially extending salient stator poles in magnetic flux relationship with the first set of nonsalient rotor poles, with the stator poles of the respective pole pieces being interleaved with one another, all of said poles being substantially identical to one another and being tapered in the axial direction, each said pole piece having on its outer periphery square cut teeth which closely fit with corresponding square cut teeth of the other pole piece of said first pair;

an inner stator comprising a second pair of pole pieces of annular cup-shaped configuration in opposed relationship with each other to form an annular space therebetween, each of said second pair of pole pieces being substantially identical to each other and disposed concentrically within the inner periphery of said rotor and having an axial dimension which is not greater than that of the rotor, each said pole piece in said second pair including on its outer periphery spaced-apart, axially extending salient stator poles in magnetic flux relationship with the second set of nonsalient rotor poles, with the stator poles of the respective pole pieces being interleaved with one another, all of said poles being substantially identical to one another and being tapered in the axial direction, each said pole piece having on its inner periphery square cut teeth which closely fit with corresponding square cut teeth of the other pole piece of said first pair;

first annular energizing means surrounding the outer periphery of the rotor and comprising electrically conductive wire annularly wound substantially entirely within the annular space between the first pair of stator pole pieces for producing a magnetic field in the salient stator poles of said first pair; and second annular energizing means within the inner periphery of the rotor and comprising electrically conductive wire annularly wound substantially entirely within the annular space between the second pair of stator pole pieces for producing a magnetic field in the salient stator poles of said second pair; and means for sequentially energizing said first and second energizing means to respectively produce the corresponding magnetic field with said fields in different phase relationship with each other.

* * * * *